Aug. 10, 1937.                A. W. EDWARDS                2,089,736
                       AUTOMATIC CHANGE SPEED GEARING
                          Filed Aug. 19, 1935          3 Sheets-Sheet 1

A. W. Edwards
INVENTOR

By Glascock Downing & Seebold
                         Attys.

Aug. 10, 1937.   A. W. EDWARDS   2,089,736
AUTOMATIC CHANGE SPEED GEARING
Filed Aug. 19, 1935   3 Sheets-Sheet 2
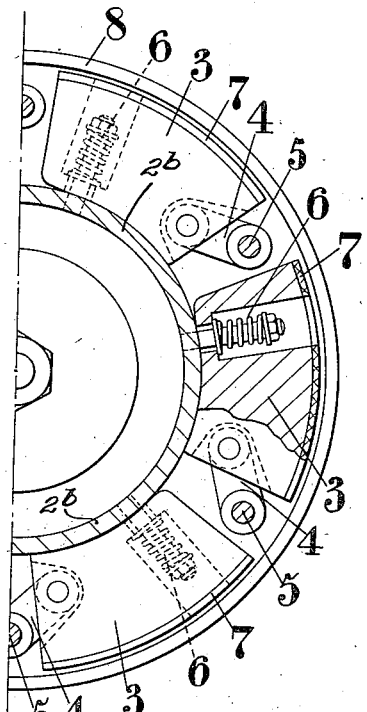
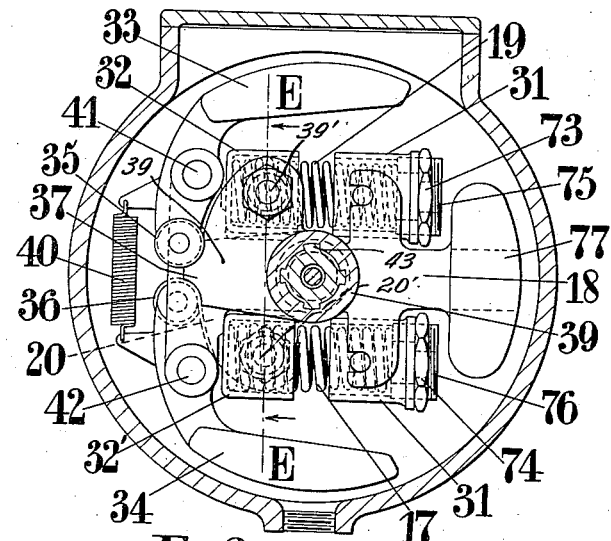
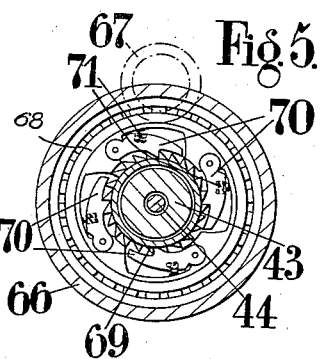
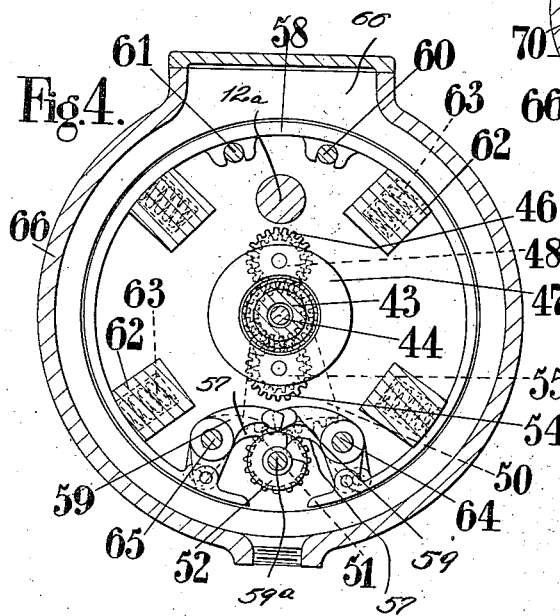
A. W. Edwards
INVENTOR
By Glascock Downing & Seebold
Attys.

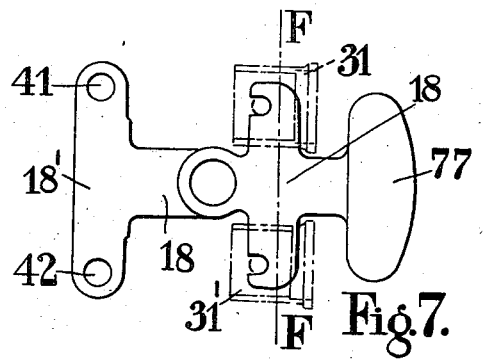
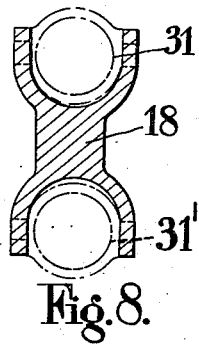
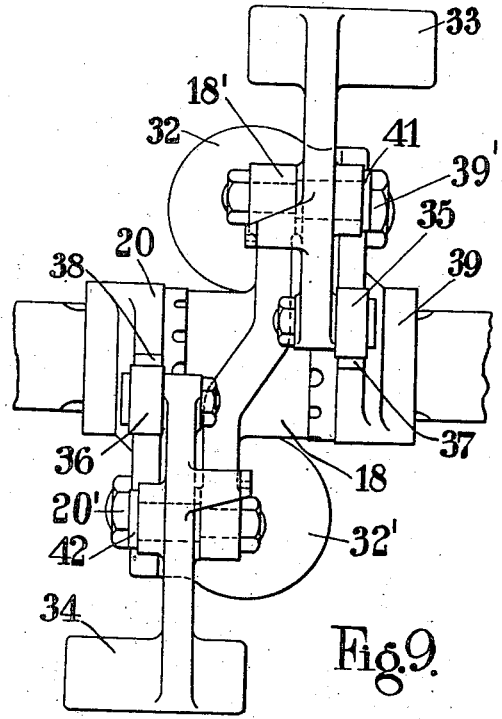

Patented Aug. 10, 1937

2,089,736

UNITED STATES PATENT OFFICE 2,089,736

AUTOMATIC CHANGE SPEED GEARING

Arthur Wallace Edwards, Romiley, England, assignor to Ferranti Electric Inc., New York, N. Y.

Application August 19, 1935, Serial No. 36,910
In Great Britain August 23, 1934

4 Claims. (Cl. 74—259)

This invention relates to automatic change speed mechanism embodying resilient torque coupling means deformation of which in accordance with the load torque is utilized to effect gear changes.

Self-propelled vehicles such as motor cars represent one example of machines to which such gears are applicable.

The main object of the present invention is to provide improved mechanism wherein the need for axial thrusts, either continuously or even intermittently operative, is avoided.

An advantage of the invention is that a control of the "gear ratio" between a driving shaft and a driven shaft which is dependent both upon the torque and the speed of the driven shaft may be utilized. Such a control is desirable if the torque characteristic of the engine is a non-uniformly rising one but if the torque characteristic is substantially uniform over the speed range then a pure torque control alone may be employed. The gear if desired may be furnished with an auxiliary centrifugally operating device.

The invention consists in an automatic change speed mechanism embodying resilient torque coupling means deformation of which in accordance with the torque transmitted is utilized to effect gear change characterized by the provision of mechanism for performing gear change operation as defined in the claims appended hereto.

Referring to the accompanying diagrammatic drawings:—

Figure 2 is an end view thereof looking in the direction of the arrows A—A partly in section of part of the centrifugal clutch mechanism.

Figure 3 is a cross-sectional view on the line B—B through the torque control device of Figure 1 looking in the direction of the arrows.

Figure 4 is a cross-sectional view on the line D—D through the second-gear clutch mechanism of Figure 1 looking in the direction of the arrows.

Figure 5 is a cross-sectional view on the line C—C through the centrifugal ratchet device of Figure 1 looking in the direction of the arrows.

Figure 6 is a cross-sectional view on the line E—E through the torque control device of Figure 3 looking in the direction of the arrows.

Figure 7 is an end view of the floating member 18 with the associated parts removed.

Figure 8 is a cross-sectional view on the line F—F of Figure 7, and

Figure 9 is an elevation of the trigger mechanism of Figure 3 with certain parts omitted.

Figure 1:
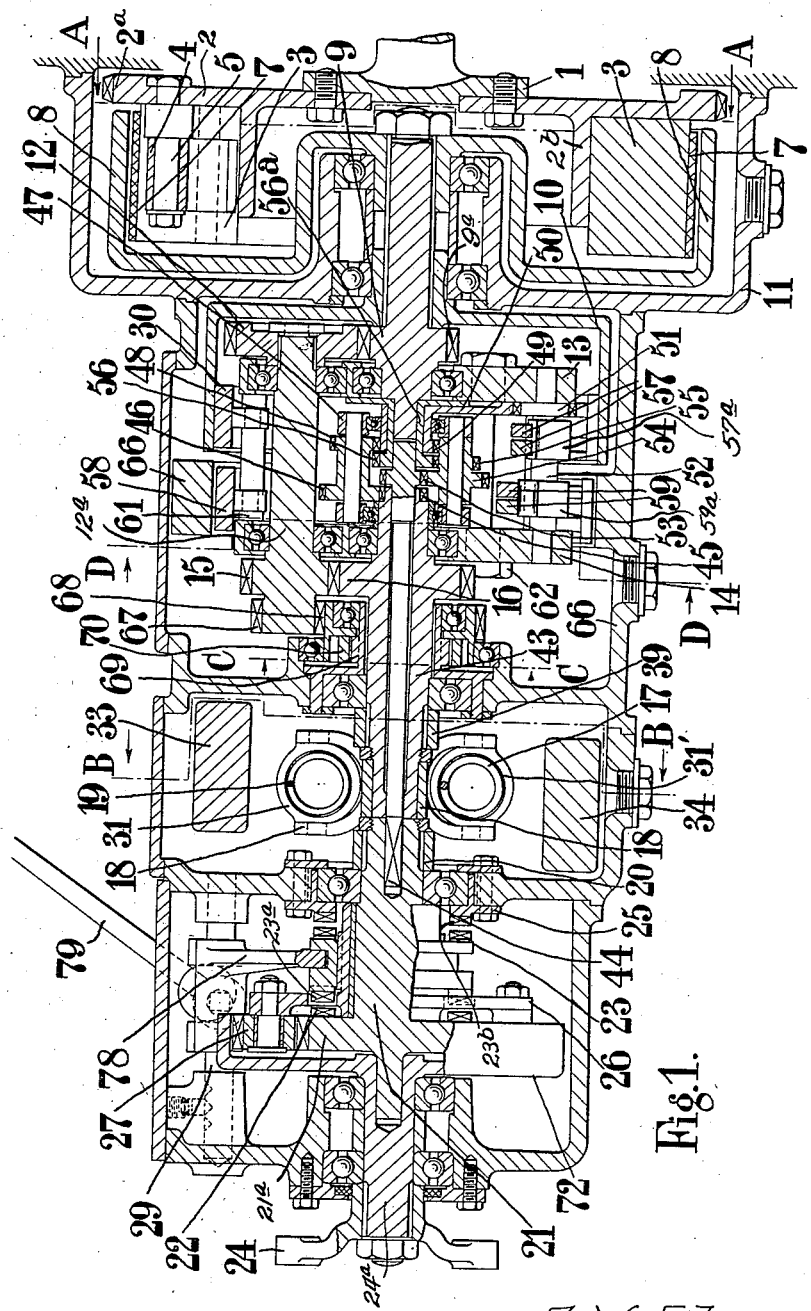
Figure 1 is a vertical sectional view of one convenient form of mechanism embodying the invention giving three-speed-forward-and-reverse drive as suitable, e. g., for an automobile.

In carrying the invention into effect according to one example as applied to a three-speed-forward-and-reverse change speed mechanism suitable for an automobile a disc 2, Figure 1, is bolted to a flange 1 on the end of the engine crank shaft and on the outer edge of the disc teeth 2a for the starter are cut. The disc 2 carries centrifugal weights 3, Figure 3, which are anchored to the disc by links 4, pins 5 and springs 6, the latter placed on the trailing side of the centre of gravity of the weights. The weights are faced on their outer sides with friction material 7 and are supported when at rest on a flange 2b on the disc 2. The whole of this assembly forms the engine fly wheel and inner member of the engine clutch.

When the engine is idling the weights are held on the flange by the springs 6 clear of the outer member of the clutch 8. As the speed of the engine is increased the weights 3 move outwards, the ends of the weights adjacent to the links first coming into contact with the outer clutch member 8 owing to the springs holding in the outer ends finally as the speed increases the whole surface of the weight comes into contact and transmits the drive. The links are disposed at such an angle that when the engine is driving the clutch member 8 they tend to increase the force on the engaging friction faces, but if the clutch member 8 tries to drive the engine the links force the weights 3 inwards to free the clutch and allow the engine to idle, thus providing a free wheel.

The outer member of the clutch 8 and the clutch drum 10 are rigidly mounted on a splined shaft 9 embodying a gear wheel 9a, this unit being carried in ball bearings supported by a fixed outer casing 11 attached to the end of the engine crank case. The gear wheel 9a meshes constantly with a gear wheel 12 carried on a ball bearing shaft 12a in a planetary housing 13, 14. On the other end of this shaft a gear wheel 15 meshes constantly with gear wheel 16 coaxial with the gear wheel 9. The gear wheel 16 transmits power to a torque coupling crank 39, Figure 3, carried on splines on a hollow shaft 43 and the power is thence transmitted through a torque spring 19 to a floating member 18, which latter is mounted loosely on the shaft 43, and through a heavy torque spring 17 to a further torque coupling crank 20, Figure 6. From the crank 20 power passes through the splined shaft 21, Figure 1, to a sun wheel 21a mounted on it.

This sun wheel meshes with one or more planet wheels 27 carried in a planet gear housing 26. The planet wheels 27 also mesh with teeth on the inside of a wheel 72 carried on a shaft 24a. A flexible coupling 24 is mounted on the shaft 24a.

When running in "top gear", a clutch 30, carried on the planetary housing 13, 14 is expanded in the manner described later, so as to lock the housing 13, 14 to the clutch drum 10; the planetary system thus rotates with the shafts 9 and 43 as a solid unit, and power is transmitted directly from the shaft 9 to the shaft 43.

Power from the shaft 43 is transmitted to the splined shaft 21 by way of a torque control device which determines which "gear ratio" is in operation.

The torque control device comprises the springs 19 and 17 which are of large diameter; one end of each spring is disposed within a spring container 32, 32'. The other end of each spring is disposed within a cooperating spring container 31, 31' and the containers 31, 31', 32, 32' are swivelled as shown in Figure 7 so that the load is always one of pure compression. The opposing pairs of cups 31, 32 and 31', 32' are so arranged and constructed as to come into contact with one another and thus act as stops when the springs 19, 17 are under full load. By this means the reduction in length of the springs is not sufficient to over-stress them. The springs may be adjusted in position or new springs fitted by means of screw caps 75 and 76 and lock nuts 73 and 74 on the ends of the containers 31. A balance weight 77 forms part of the floating member 18 and balances the assembly.

When the torque delivered by the engine through the shaft 43 to the torque control device is sufficiently light, the mechanism occupies the position shown in the drawings, neither spring 19 nor spring 17 being compressed beyond its initial loading, and "top gear" is in operation. If under these conditions the engine is giving maximum torque then any demand by the load for more torque can only be met by a change of "gear ratio". This is performed automatically by the varying torques twisting the shafts 43 and 21 relatively to one another. Thus twist is conveyed by the torque coupling crank 39 (Figure 3) attached to shaft 43 to the container 32 associated with spring 19 and so compresses this spring. The cup 32 embodies a stud 39' carried on the crank 39 (Figures 3 and 6). The torque spring 17, being stronger than spring 19, is not compressed until the conditions are such that the demand by the load for more torque exceeds that available through the gear ratio brought into action by the compression of spring 19.

The torque is conveyed again from the cup 32' to the coupling crank 20 fast on the shaft 21 through a stud 20' (Figures 3 and 6).

To give a trigger action to the gear change, that is to say to make the change take place at an exactly predetermined load and to compensate for a rising torque of the engine, a centrifugal weight 33 is provided mounted upon an arm pivotally carried by a pin 41, Figures 2 and 9, on the floating member 18. This arm carries a roller 35 which engages with a cam projection 37 on the torque coupling crank 39 and causes the thrust of the crank 39 to be passed along the cross bar 18', Figure 7, to a pivot pin 42 and thence to the arm of a weight 34. This arm carries a roller 36 which engages a projection or cam 38 on the torque coupling crank 20 so that the thrust is thereby conveyed to this coupling crank, the torque springs 19, 17 being bridged mechanically. This prevents spring 19 from being compressed until the centrifugal weight 33 is moved inwards by the action of the cam or projection 37 upon the roller 35 and prevents the spring 17 from being compressed until inward movement of the weight 34 is produced by the roller 36 being caused to move outwards over the edge of the cam or projection 38. At low speeds a spring 40 constitutes an auxiliary resistance in the torque coupling in series with that imposed by the main springs 19 and 17 and as the speed increases the centrifugal weights add to the resistance imposed by the main springs 19 and 17 so that the torque required to operate the gear will depend also upon the speed. By suitably proportioning the centrifugal weights the torque at which the torque control device will operate can be adjusted, so that when the demand from the back axle reaches, say, 90% of the maximum torque of the engine at any speed the gear will be changed as explained below; in other words, a torque characteristic to match any given engine up to maximum torque may be realized. Above this value the engine torque falls off but the torque required to operate the torque responsive coupling will continue to increase thus producing the effect of locking the mechanism in top gear at all speeds above, say, 35 M. P. H.

The load required to set the torque control device for changing down is preferably slightly less than that required for changing up in order to avoid tendency for "hunting".

When the torque control coupling operates to compress the first or weaker spring 19 "second gear" is brought into operation. A relative angular displacement takes place between the torque coupling cranks 39 and 18 which latter is not displaced with respect to crank 20. This causes a corresponding angular displacement between the hollow shaft 43 rigid with the crank 39 and the coaxial shaft 44 in driving connection with the splined shaft 21 carrying the crank 20.

This angular motion is transferred from the shaft 44 to the planetary housing 13, 14, (which may be rotating at a different speed from that of the shaft 44), in the following manner:—A sun wheel 45 rigidly mounted on one end of the shaft 43 gears with a planet wheel 46 carried in a planetary housing 47. The planet wheel 46 is rigid with a further planet wheel 48 which latter gears with a sun wheel 49 mounted on a sleeve coaxial with the main shaft 9. This sleeve carries a toothed quadrant 50, Figure 4, engaging with a gear wheel 51 on a shaft 52 supported in the housing 13, 14. Any difference of speed between the shaft 43 and the main planetary housing 13, 14 will result in the planetary housing 47 rotating idly but no movement of the quadrant 50 will take place since the stepped planetary gears 46, 48 cannot transmit power when the planetary housing 47 is free to rotate. On the shaft 44 is mounted a sun wheel 53 which gears with a planet wheel 54 carried in the inner planetary housing 47, the wheel 54 being rigid with a further planetary wheel 55 geared to a sun wheel 56 mounted on a coaxial sleeve 56a fixed to the outer housing 13, 14. The inner planetary gear system is thus in duplicate. That is to say, the sun wheel 45 is connected to the sun wheel 49 (with which the quadrant 50 is rigid) by way of the mutually rigid or stepped planet wheels 46, 48 whilst the sun wheel 53 is connected to the sun wheel 56 (which is rigid with the housing 13, 14) by way of the mutually rigid or stepped planet wheels 54, 55. This inner planetary gear system, being free to rotate idly, cannot transmit power but any angular displacement between the two sun wheels 45, 53 on the one side will be reproduced between the two sun wheels 49, 56, on the other side irrespective of the speeds of shaft 43 and of the main gear housing 13, 14; thus the angular displacement of the torque control coupling causes angular movement of the planetary shaft 52.

The shaft 52 operates the top gear or solid driving clutch 30 by means of a cam 57a and two bell-crank levers 57 and it also operates the second-gear clutch 58 by means of a similar cam 59a, Figure 4, and pair of bell-crank levers 59.

The cam 57a, the pair of levers 57 and the expanding clutch band 30 are arranged in similar manner to the parts 59a, 59 and 58 in Figure 4.

When the angular displacement is transferred to the shaft 52, the cam 57a operates the bell crank levers 57 so that the "top gear" clutch 30 is disengaged from the clutch drum 10 and the cam 59a operates on the bell crank levers 59 so causing the "second gear" brake band 58 to engage with a stationary casing member 66, so bringing the planetary housing 13, 14 to rest.

The second-gear brake ring 58 is anchored to the main planetary housing 13, 14 by pins 60, 61 (Figure 4) and the operating levers 59 are carried on fulcrum pins 64, 65. The brake band 58 is contracted by the levers 59 on to the longitudinals 62 which centre it, these longitudinals serving also to hold together the two side plates of the housing 13, 14 to form the main planet carrier. When the brake 58 is in operation the cam 59a releases the levers 59 and the brake band is forced to expand into contact with a stationary casing member 66 by means of radial springs 63, the force of the braking being dependent on the strength of these springs. The clutch band 30 is similarly constructed and supported on the same longitudinals 62.

Since the planetary housing 13, 14 is now frictionally rigid with the stationary casing 66 the power is transmitted from the shaft 9 to the shaft 43 through gear wheel 9 and gear wheel 12 and through the shaft 12a which turns in fixed bearings and thence from gear wheel 15 to gear wheel 16 thus providing "second gear".

When the torque required by the load exceeds that which the engine is capable of giving with "second gear", the spring 17, Figure 3, of the torque coupling is also compressed so that both springs 19 and 17 are now compressed into their retaining containers 31, 32, 31', 32' and the torque control coupling drives solid, that is to say, the containers 32 and 31 contact with one another and so do the containers 31', 32' and no further angular displacement between torque coupling crank 39 and torque coupling crank 20 is possible. This final movement of the torque control coupling transfers a further angular displacement to the shaft 52 in the manner described above. This displacement causes cam 59a to operate the bell crank levers 59 so disengaging "second gear" brake band 58 from contact with the stationary casing member 66. "Top gear" clutch 30 remains disengaged.

The main gear planetary housing is now free to rotate and the speed at which it does so decides the "bottom gear" ratio. This rotation is controlled by a main planet gear wheel 67 meshing with a floating gear 68 coaxial with shaft 43; this latter gear wheel has a one-way brake mounted in its bore (Figure 5). The one-way brake comprises a ratchet wheel 69 fixed coaxially with the shaft 43 to the stationary casing and pawls 70 pivotally mounted within the gear wheel 68. These pawls are made sufficiently heavy to enable centrifugal force to hold them out of contact with the ratchet wheel when "top" and "second gears" are in operation and light springs 71 of just sufficient strength to overcome the weight of the pawls are fitted as shown. The pawls over-run the fixed ratchet wheel on "top" and on "second gears" but when "bottom gear" is coming into operation the speed of rotation of the gear wheel 68 drops as the planetary housing 13, 14 begins to rotate idly backwards and the pawls 70 move inwards to contact with the ratchet wheel. The pawls, however, over-run the ratchet wheel teeth until the backward speed of the planetary housing is such that the gear wheel 68 comes to rest whereupon the pawls drop into engagement with the teeth of the stationary ratchet wheel 69. This device serves to prevent the gear wheel 68 from rotating in the reverse direction which it would otherwise do if the speed of the planetary housing increased; thus the planetary housing is allowed to rotate backwards at a controlled speed when "bottom gear" ratio is operative.

The planetary housing 13, 14 and auxiliary parts are counterbalanced or drilled in order that they may be dynamically balanced.

A separate "reversing gear" is provided, shown in neutral position in Figure 1. When a sleeve 23 rotationally rigid with the gear carrier 26 is moved to the left a dog clutch element 23a on it engages with a co-operating element 22 on the sun wheel 21a which thus locks the sun wheel 21a and planet wheel 27 together and the reverse assembly then runs solid, transmitting power direct to the flexible coupling 24. When the sleeve 23 is moved to the right, however, another dog clutch element 23b on it engages with a co-operating element 25 fixed to the outer casing, thus locking the planet gear carrier 26 to the stationary outer casing; planet gear wheels 27 then transmit power at reduced speed to the internal wheel 72 and coupling 24 in the reverse direction. The sleeve 23 is controlled by a forked lever 78 and shaft 29 connected to a convenient hand lever 79 disposed near the driver. All the "gear ratios" are available in reverse running as well as in forward running.

Preferably the whole mechanism is adapted to run in oil so that metal to metal clutch surfaces may be employed provided with grooves at alternate angles to allow the oil to escape from between the friction surfaces.

If desired the frictional engagement of the brake ring 58 and the clutch 30 with their respective members 66 and 10 may be augmented by self-servoing action in a well-known manner.

I claim:

1. The combination with gear change means comprising a compounded pair of control sun and epicyclic gear trains, of a resilient torque coupling means comprising parts having related movements in accordance with the torque transmitted to effect gear change, and coupling means between each of said gear trains and one of the relatively movable parts of said resilient torque coupling means respectively, said pair of gear trains each embodying a driving sun wheel, a driven sun wheel and an interconnecting stepped planet wheel, both stepped planet wheels being mounted on a common carrier which is coaxial with all four sun wheels.

2. The combination with gear change means comprising a compounded pair of control sun and epicyclic gear trains, of a resilient torque coupling means comprising parts having related movements in accordance with the torque transmitted to effect gear change, and coupling means between each of said gear trains and one of the relatively movable parts of said resilient torque coupling means respectively, centrifugal means, serving to provide initial resistance to a degree dependent upon driven shaft speed, said initial resistance acting to augment said resiliently resisting means.

3. The combination with gear change means comprising a compounded pair of control sun and epicyclic gear trains, of a resilient torque coupling means comprising parts having related movements in accordance with the torque transmitted to effect gear change, and coupling means between each of said gear trains and one of the relatively movable parts of said resilient torque coupling means respectively, a trigger device comprising auxiliary resiliently resisting means and centrifugal means serving to augment said resiliently resisting means to delay gear change until the energy stored in the said trigger device is greater than the energy required to effect a gear change.

4. The combination with gear change means comprising a compounded pair of control sun and epicyclic gear trains, of a resilient torque coupling means comprising parts having related movements in accordance with the torque transmitted to effect gear change, and coupling means between each of said gear trains and one of the relatively movable parts of said resilient torque coupling means respectively, said pair of gear trains each embodying a driving sun wheel, a driven sun wheel and an interconnecting planet wheel, both planet wheels being mounted upon a common carrier coaxial with said sun wheels and said planet carrier embodying clutch and brake operating means for controlling the speed ratio of the main transmission train.

ARTHUR WALLACE EDWARDS.